United States Patent [19]

Caughey

[11] Patent Number: 4,586,442
[45] Date of Patent: May 6, 1986

[54] GASIFIER METHOD AND APPARATUS

[75] Inventor: Robert A. Caughey, Antrim, N.H.

[73] Assignee: New Hampshire Flakeboard, Antrim, N.H.

[21] Appl. No.: 624,403

[22] Filed: Jun. 25, 1984

[51] Int. Cl.[4] ............................................. F23G 5/12
[52] U.S. Cl. .................................... 110/229; 110/258; 110/278; 110/298; 110/346
[58] Field of Search ............... 110/227, 229, 258, 278, 110/298, 346, 347; 48/76

[56] References Cited

U.S. PATENT DOCUMENTS

| | | | |
|---|---|---|---|
| 4,254,715 | 3/1981 | Lahaye et al. | 110/278 X |
| 4,475,471 | 10/1984 | Hand et al. | 110/345 |
| 4,484,530 | 11/1984 | Goetzman | 110/298 X |

Primary Examiner—Edward G. Favors
Attorney, Agent, or Firm—Lahive & Cockfield

[57] ABSTRACT

A gas generator for generating combustible gases from biomass material comprising an enclosure within which is mounted an inclined support intermediate the top and bottom such as to define a gas generating chamber above the support and a plenum chamber below the support, a feed conductor at the top of the enclosure through which biomass material is delivered to the upper end of the support, a discharge conductor at the top of the enclosure through which gas generated within the chamber is discharged and a conductor at the bottom for delivering primary air to the underside of the support, the support being characterized in that it is comprised of a plurality of hollow metal tubes, the longitudinal axis of which partake of the inclination of the support, linkage including a crank for effecting oscillation of the tubes about their longitudinal axis, a blower arranged to deliver cooling air to the lower ends of the tubes, a vent chamber at the upper ends of the tubes for discharging air therefrom, a blower for supplying primary air to the plenum chamber below the support and an ash discharge screw at the bottom of the plenum chamber for discharging ash.

15 Claims, 3 Drawing Figures

GASIFIER METHOD AND APPARATUS

BACKGROUND OF THE INVENTION

Apparatus for burning biomass material is shown in U.S. Pat. Nos. 1,256,146; 1,862,920; and 783,476. The Ward U.S. Pat. No. 1,256,146 shows a grate system wherein tubular members are inclined downwardly in the direction of fuel travel. The adjacent tubular members comprising the grate system are oscillated oppositely and have threads on their surfaces to promote movement of the fuel downwardly and to cause the ash to sift through to the underside. Air is supplied to the lower ends of the tubular members for cooling. The structure therein shown is objectionable because the oscillation of the tubular members in opposite directions tends to crush and wedge the fuel between the tubular members such that any foreign matter which is present becomes entrained between the tubular members and the screw thread surfaces tend to force the fuel downwardly at a rate which is not consistent with efficient pyrolysis. Ehrlich U.S. Pat. No. 1,812,940 and Smith U.S. Pat. No. 783,746 shows grate structures in the form of hollow grate bars disposed transversely of the direction of flow which neither assists in the downward flow of material nor provides for preheating of the fuel to insure efficient pyrolysis. It is the purpose of this invention to provide a grate structure comprised of hollow grate bars wherein the fuel is allowed to flow freely downwardly thereon as pyrolysis takes place at a rate to assure efficient pyrolysis, to provide for sifting of the ash through the grate bars to the underside without crushing or jamming of fuel between the grate bars and to provide for cooling of the grate bars and preheating the fuel as it descends to enhance pyrolysis.

SUMMARY OF THE INVENTION

As herein illustrated, the gas generator for generating combustible gases by pyrolysis of biomass material according to this invention comprises means defining a closed chamber, a support positioned in the chamber intermediate the top and bottom for supporting a bed of biomass material in the chamber, said support being inclined, and means for at times supplying biomass material to the upper end of the inclined support for descent thereon toward the lower end. The support divides the chamber into a gas generating chamber above the support and a plenum chamber below the support and comprising spaced, parallel, hollow tubes, the longitudinal axis of which participate in the inclination of the support. There is means for supplying primary air to the plenum chamber below the support, means for at times oscillating the tubes about their individual axis to promote descent of the biomass material and to clear the support of ash and means for drawing off the gases generated within the gas chamber at the top. There is means for introducing air into the tubes at their lower ends to effect cooling at their lower ends and preheating of the biomass material at their upper ends and means for venting air from the upper ends. Desirably, the tubes are comprised of cast iron and have smooth exterior surfaces, are of approximately 2½ inches in diameter, are spaced apart approximately ⅛ of an inch and are oscillated about 5°. There is means defining a feed chute at the top of the chamber for delivering biomass material to the upper end of the support, means for discharging the generated gas from the top of the chamber, and means for removing ash from the bottom of the chamber. Desirably, the support is inclined at approximately 30° to the horizontal.

The invention also resides in a method of burning biomass material to generate combustible gases comprising supporting a bed of biomass material on an inclined grate comprised of spaced, parallel, tubular grate bars having smooth exterior surfaces, supplying primary air to the undersides of the grate bars at a pressure to cause the air to flow upwardly through the spaced, parallel grate bars between the bars, at times oscillating the grate bars to break up ash generated by combustion of the biomass material and flowing cooling air through the interior of the tubular grate bars to maintain the latter at a temperature below the slagging temperature of the biomass material. The method includes providing air spaces between the grate bars of approximately ⅛ to 3/16 of an inch, delivering the primary air at a pressure of approximately 0.02 to 0.20 inches water column, rotating the grate bars approximately 5° at a frequency of 6 cycles per minute and employing the cooling air heated by passage through the tubular grate bars for preheating the primary air and/or the biomass material prior to delivery of the latter into the generator.

The invention will now be described in greater detail with reference to the accompanying drawings, wherein.

Figure 1:
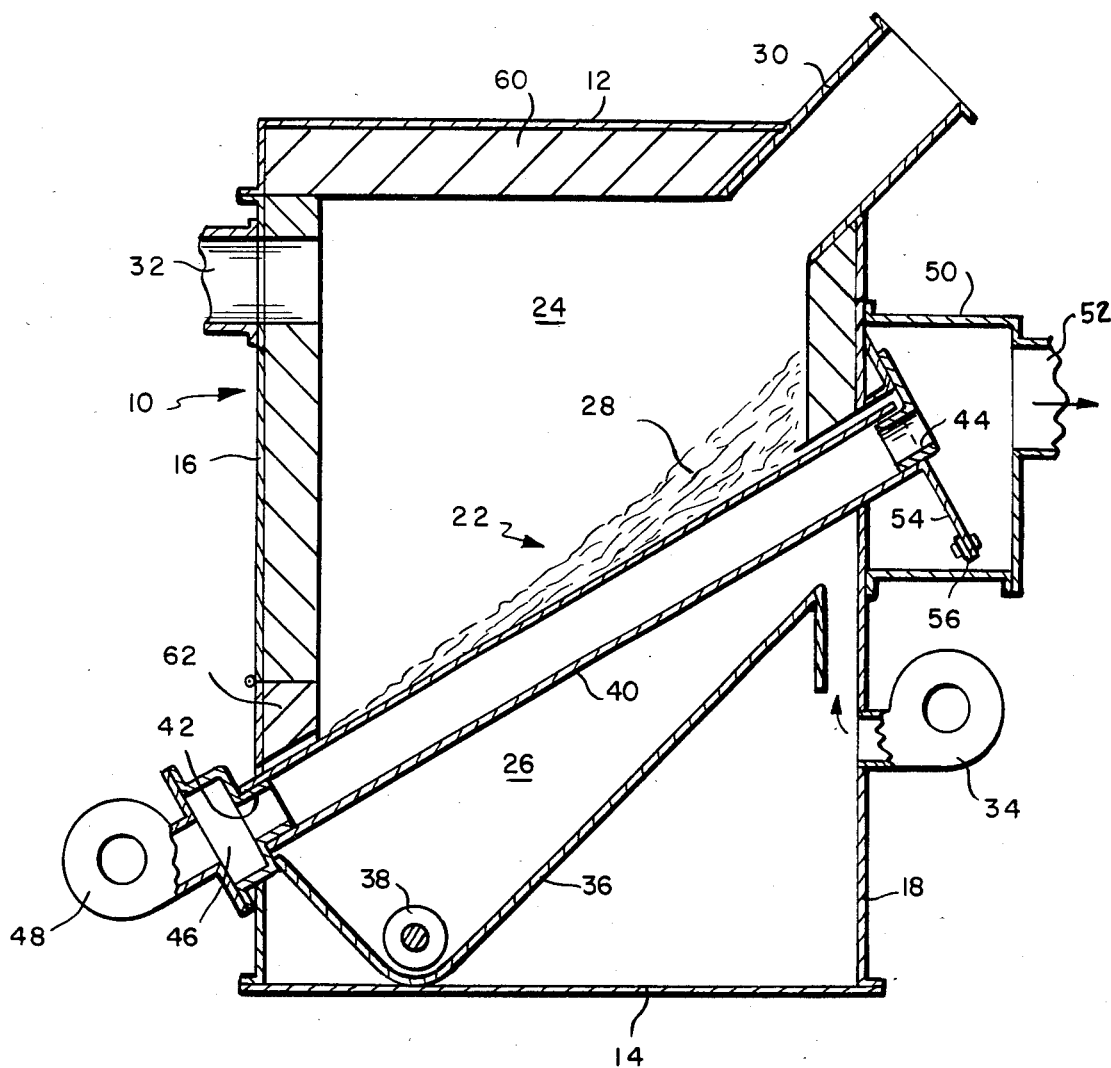
FIG. 1 is a vertical section of the gasifier.
Figure 2:
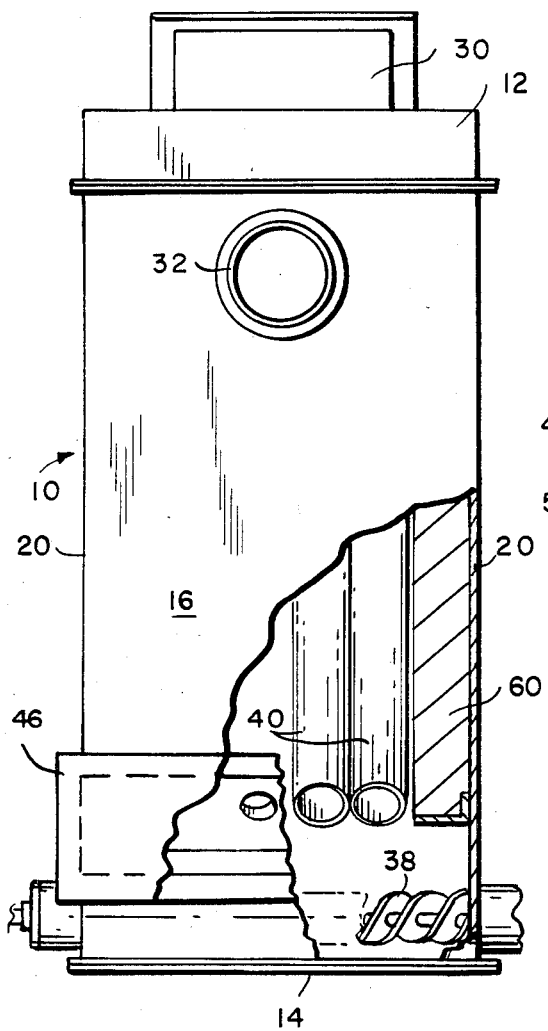
FIG. 2 is an elevation partly broken away as seen from the left side of FIG. 1.
Figure 3:
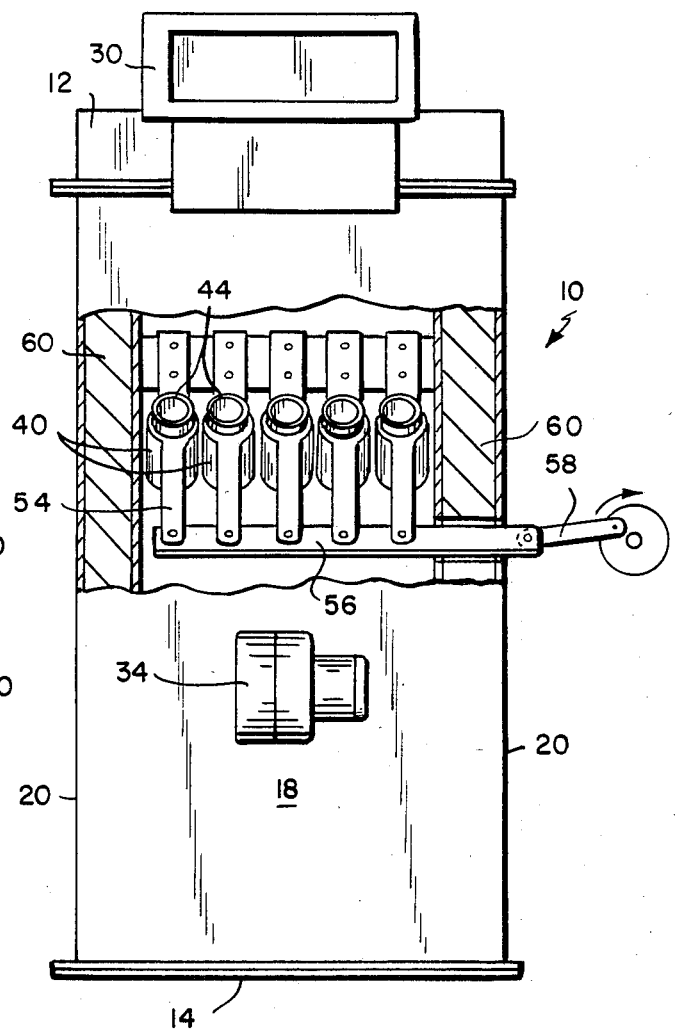
FIG. 3 is an elevation as seen from the right side of FIG. 1.

Referring to the drawings, the gas generator as herein illustrated comprises an enclosure 10 of generally rectangular configuration in vertical and horizontal section comprised of sheet metal having a top wall 12, a bottom wall 14, front and back walls 16 and 18, and side walls 20—20.

An inclined support 22 is mounted within the enclosure intermediate the top and bottom so as to divide the enclosure into an upper combustion chamber 24 and a lower plenum chamber 26. The inclined support 22 provides for supporting a bed of biomass material 28 for pyrolysis to generate a combustible gas. The biomass material is supplied to the upper end of the inclined support through a conductor 30 at the top of the enclosure and the generated gas is drawn off from the chamber 24 at the top through a discharge conductor 32.

Primary air is supplied to the plenum chamber 26 by means of a primary air blower 34 supported at the rear wall 18 at a pressure of approximately 0.02 to 0.20 inches of water.

In the plenum chamber 26 at the bottom, there is an ash receptacle 36 which is substantially coextensive with the lower side of the inclined support 22 and which has at its bottom an ash discharge screw 38. As illustrated in FIG. 1, ash receptacle 36 is formed by a downwardly and inwardly sloping wall structure within plenum chamber 26.

In accordance with this invention, the inclined support 22 is comprised of a plurality of spaced, parallel grate bars in the form of hollow tubes 40 supported at their opposite ends in lower bearing members 42 and upper bearing members 44 for rotation about their longitudinal axes which partake of the inclination of the inclined support constituted by the aforesaid tubes. Desirably, the tubes 40 are of cast iron of approximately 2½ inches in diameter and have smooth external surfaces. If the grate tubes are adequately cooled, mild steel may be used. The tubes are desirably spaced apart approximately ⅛ to 3/16 inch. At the lower ends of the tubes, there is a plenum chamber 46 with which the lower ends of the tubes 40 are in communication. A blower 40 is mounted to the plenum chamber 46 for supplying cooling air thereto and to the lower ends of the tubes. At the upper ends of the tubes, there is a warm air plenum chamber 50 with which the upper ends of the tubes 40 are in communication and this is provided with a warm air discharge opening 52. Discharge opening 52 can be arranged to route heated cooling air from tubes 40 to primary air blower 34 to preheat the primary air. Alternatively, to dry the biomass material, discharge opening 52 is arranged to route the heated cooling air from tubes 40 to a storage area (not shown) for the biomass material, which storage area is in communication with conductor 30.

Each of the tubes 40 has fixed to it an arm 54 and these arms are pivotally connected to a bar 56, at one end of which there is a crank arm 58 by means of which the bar 50 can be oscillated and, in turn, the tubes 40 can be oscillated through their connecting arms 54. The tubes are oscillated in unison in the same direction approximately 5° at approximately 6 cycles per minute.

As illustrated, that portion of the enclosure above the support 22 comprising the combustion chamber 24 is lined with a refractory material 60 and the front wall 16 is provided with a cleanout door 62.

The hollow tubes 40 comprising the inclined support 22 provide for maintaining the support at lower than combustion temperatures so as to minimize damage thereto by slagging and provide for reheating the biomass material as it descends from the upper end of the support toward the lower end, thereby improving the efficiency of the pyrolysis so as to obtain a maximum generation of combustible gases and minimum loss of unburned biomass material at the lower end of the support. The tubes are rotated in unison in the same direction, in contrast to the prior grate elements which are rotated in opposite directions, thus avoiding any crushing or wedging effect of foreign material entrained between the tubes and their surfaces are smooth rather than of screw-type configuration as has been previously employed so that the biomass material is not forced down the support, but is allowed to slide slowly downwardly as the material below is consumed, to thus insure complete pyrolysis. The smooth surfaces tend to remain clean while enhancing the transmission of heat from the tubes to the fuel at the upper end of the support where fuel is fresh and needs to be preheated to induce pyrolysis.

The structure described and illustrated is capable, when fired to capacity, to produce approximately 750,000 BTU per square foot of grate oven.

It should be understood that the present disclosure is for the purpose of illustration only and includes all modifications or improvements which fall within the scope of the appended claims.

What is claimed is:

1. Gas generator apparatus for generating combustible gas by pyrolysis of biomass material, said generator apparatus comprising, in combination
an enclosed chamber,
a plurality of parallel, uniformly inclined and axially-extending support tubes, each of which has a hollow interior axial passage connecting a lower inlet end and an upper outlet end, said support tubes dividing said chamber to form a single gas-generating first chamber region situated above said tubes and a plenum second chamber region below said tubes, said tubes being adapted for oscillation about the axis thereof in a common direction to facilitate the delivery of ash and unburned biomass into the second chamber region,
means for introducing biomass material into said first chamber region onto the upper ends of said tubes,
means for introducing primary air into said second chamber region for flowing upwardly between said tubes for pyrolysis of said biomass material,
means for introducing cooling air into the passages of said tubes at the lower inlet ends thereof for cooling said tubes, said cooling air becoming heated by a heat exchange process as it cools said tubes, and said air being vented from the upper ends thereof,
means for exhausting from said frist chamber region combustible gas generated by the pyrolysis of said biomass,
means for removing ash and unburned biomass from the first chamber region at the lower ends of said tubes, and
screw discharge means for removing ash and unburned biomass from said second chamber region.

2. Gas generator apparatus according to claim 1 further comprising a means for utilizing the heated cooling air vented from the upper ends of said tubes for preheating the primary air.

3. Gas generator apparatus according to claim 1 further comprising means for utilizing the heated cooling air vented from the upper ends of said tubes for drying said biomass material prior to the introduction thereof into said first chamber region.

4. Gas generator apparatus according to claim 1 wherein said tubes are approximately 2½ inches in diameter and are spaced apart approximately ⅛ to 3/16 inch from each other.

5. Gas generator apparatus according to claim 4 further comprising means for periodically oscillating said tubes in a common direction through five degrees at a frequency of approximately six cycles per minute.

6. Gas generator apparatus according to claim 5 wherein said tubes are inclined at an angle of approximately 30 degrees.

7. Gas generator apparatus according to claim 6 further comprising a first plenum means communicating with all of said tubes at the lower ends thereof for introducing cooling air into said tubes, and a second plenum means communicating with all of said tubes at the upper ends thereof for receiving heated cooling air vented from said tubes.

8. Gas generator apparatus according to claim 7 further comprising sealable door means communicating with first chamber region for removing ash and unburned fuel from said first chamber region.

9. Gas generator apparatus according to claim 8 wherein said second chamber region comprises an ash receptacle having walls which slope downwardly and inwardly to join at a base portion.

10. Gas generator apparatus according to claim 9 wherein said screw discharge means is situated proximal to said base portion of the ash receptacle.

11. A method of gasifying biomass material comprising the steps of
providing an enclosed chamber having therein a grate structure formed by a plurality of uniformly inclined tubes, each of said tubes having a hollow interior axial passage connecting a lower inlet end and an upper outlet end, said grate structure dividing said enclosed chamber to form a first chamber region above said grate and a second chamber region below said grate, delivering a biomass material into said first chamber region onto the upper end of said tubes, directing primary air upwardly between said tubes for pyrolysis of said biomass material, periodically oscillating said tubes in a common direction about the axis thereof for facilitating delivery of ash and unburned biomass to said second chamber region, and to facilitate the transport of some of said ash and unburned fuel to the lower end of said grate, pyrolyzing said biomass material to produce a combustible gas, venting said combustible gas produced by the pyrolysis of said biomass material from said first chamber region, collecting said ash and unburned biomass at the lower end of said grate, removing said unburned waste from the lower end of said gate through a sealable door means, collecting ash and unburned biomass in said second chamber region, removing said ash and unburned biomass from said second chamber region utilizing a screw discharge means, and cooling said tubes using a cooling air introduced into the hollow passages of the lower end of each of said support tube, said cooling air exiting as heated air from the top end of each support tube.

12. A method according to claim 11 further comprising the step of pre-heating said primary air with the heated cooling air exiting from said tubes.

13. A method according to claim 11 further comprising the step of drying said biomass material with the heated cooling air exiting from said supports.

14. A method according to claim 13 wherein the oscillating step includes oscillating said tubes through approximately five degrees at a frequency of approximately six cycles per minute.

15. A method according to claim 14 wherein the oscillating step is performed only during delivery of said biomass material into said first chamber region.

* * * * *